US008280923B2

(12) United States Patent
Robertson et al.

(10) Patent No.: US 8,280,923 B2
(45) Date of Patent: *Oct. 2, 2012

(54) SCHEMA MAPPER

(75) Inventors: George G. Robertson, Seattle, WA (US); John E Churchill, Monroe, WA (US); Mary P Czerwinski, Woodinville, WA (US); Prasad Sripathi Panditharadhya, Redmond, WA (US); Uday Bhaskara, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/352,370

(22) Filed: Jan. 12, 2009

(65) Prior Publication Data
US 2009/0125512 A1 May 14, 2009

Related U.S. Application Data

(62) Division of application No. 11/035,695, filed on Jan. 14, 2005, now Pat. No. 7,478,079.

(51) Int. Cl.
G06F 17/30 (2006.01)
(52) U.S. Cl. .................... 707/805; 707/803; 707/809
(58) Field of Classification Search .......... 707/791–792, 707/796–798, 803, 805, 962, 809; 717/109, 717/113; 715/212, 234, 763, 810, 853
See application file for complete search history.

(56) References Cited

U.S. PATENT DOCUMENTS

| 5,495,567 | A | * | 2/1996 | Iizawa et al. ................ 715/762 |
| 5,850,548 | A | | 12/1998 | Williams |
| 5,920,313 | A | | 7/1999 | Diedrichsen et al. |
| 5,923,328 | A | | 7/1999 | Griesmer |
| 6,061,515 | A | | 5/2000 | Chang et al. |
| 6,216,131 | B1 | * | 4/2001 | Liu et al. ................................. 1/1 |
| 6,278,464 | B1 | * | 8/2001 | Kohavi et al. ................. 345/440 |
| 6,490,581 | B1 | * | 12/2002 | Neshatfar et al. ..................... 1/1 |
| 6,550,057 | B1 | | 4/2003 | Bowman-Amuah |
| 6,662,189 | B2 | * | 12/2003 | Oyanagi et al. ........................ 1/1 |
| 6,745,163 | B1 | | 6/2004 | Brocious et al. |
| 6,823,495 | B1 | | 11/2004 | Vedula et al. |
| 6,874,141 | B1 | | 3/2005 | Swamy et al. |
| 6,980,211 | B2 | | 12/2005 | Lin et al. |

(Continued)

FOREIGN PATENT DOCUMENTS

WO      WO 01/98927      * 12/2001

(Continued)

OTHER PUBLICATIONS

Divya Rangarajan,SchemaMapper: A tool for visualization of schema mapping, Independent Study Report, Fall 2004, pp. 1-30.*

(Continued)

Primary Examiner — Srirama Channavajjala
(74) Attorney, Agent, or Firm — Lee & Hayes, PLLC

(57) ABSTRACT

Embodiments of the present invention provide the ability to effectively visualize the mapping between two schemas, referred to herein as a source schema (or first schema) and a destination schema (or second schema), regardless of the size or complexity of the schemas and mappings. According to one aspect of the present invention a method for visually representing a mapping between a first schema and a second schema is provided. The method includes receiving a selection of an object, emphasizing the selected object and identifying a plurality of objects that are relevant to the selected object. The objects that are identified as being relevant to the selected object are also emphasized.

10 Claims, 12 Drawing Sheets

U.S. PATENT DOCUMENTS

| | | | |
|---|---|---|---|
| 6,985,905 B2 | 1/2006 | Prompt et al. | |
| 6,986,145 B2 | 1/2006 | Gangopadhyay | |
| 7,080,083 B2 | 7/2006 | Kim et al. | |
| 7,149,730 B2 | 12/2006 | Mullins et al. | |
| 7,159,185 B1* | 1/2007 | Vedula et al. | 715/763 |
| 7,181,734 B2 | 2/2007 | Swamy et al. | |
| 7,275,066 B2 | 9/2007 | Priestley | |
| 7,429,987 B2* | 9/2008 | Leah et al. | 345/440 |
| 7,478,079 B2* | 1/2009 | Robertson et al. | 1/1 |
| 7,676,756 B2* | 3/2010 | Vedula et al. | 715/763 |
| 2002/0054155 A1* | 5/2002 | Churchill et al. | 345/826 |
| 2002/0122060 A1 | 9/2002 | Markel | |
| 2002/0178276 A1* | 11/2002 | McCartney et al. | 709/231 |
| 2002/0194357 A1* | 12/2002 | Harris et al. | 709/232 |
| 2003/0110177 A1* | 6/2003 | Andrei et al. | 707/100 |
| 2003/0120665 A1 | 6/2003 | Fox et al. | |
| 2003/0149934 A1 | 8/2003 | Worden | |
| 2003/0212698 A1* | 11/2003 | Mani et al. | 707/102 |
| 2004/0172616 A1* | 9/2004 | Rothschiller et al. | 717/114 |
| 2004/0216156 A1 | 10/2004 | Wagner | |
| 2004/0243302 A1 | 12/2004 | Barry et al. | |
| 2005/0132276 A1 | 6/2005 | Panditharadhya et al. | |
| 2005/0132282 A1* | 6/2005 | Panditharadhya et al. | 715/516 |
| 2005/0257193 A1* | 11/2005 | Falk et al. | 717/109 |
| 2006/0080338 A1 | 4/2006 | Seubert et al. | |
| 2006/0161869 A1 | 7/2006 | Robertson et al. | |
| 2006/0173873 A1 | 8/2006 | Prompt et al. | |
| 2008/0294654 A1* | 11/2008 | Muscarella | 707/100 |

FOREIGN PATENT DOCUMENTS

| | | |
|---|---|---|
| WO | WO 02/03252 * | 1/2002 |
| WO | WO02077896 | 10/2002 |
| WO | WO2005114393 A2 | 12/2005 |

OTHER PUBLICATIONS

Eben M. Haber et al. Opossum: Desk-Top Schema Management through Customizable Visualization*Proceedings of the 21th VLDB Conference, 1995 pp. 527-538.*

Joseph Fong et al. "Translating relational schema into XML schema definition with data semantic preservation and XSD graph",Information and Software Technology 47 (2005) 437-462.*

Mauricio Hernandez et al. "Clio: A Schema Mapping Tool for Information Integration", IEEE 2005 1 page.*

Sven Groppe et al. "Transforming XSLT stylesheets into XQuery expressions and vice versa", Computer Languages, Systems & Structures 37 (2011) 76-111.*

Biz Talk Transformation Maps, Apr. 22, 2004, 2pages.

J.C. Grundy et al. "Domain-specific visual languages for specifying and generating data mapping systems", Journal of visual languages and computing, vol. 15, No. 3-4, Jun.-Aug. 2004, pp. 243-263.

Philip A Benstein et al. "Incremental schema matching", VLDB'06, 2006, pp. 1-4.

Non-final Office Action received Jul. 15, 2008.

Final OA received Jan. 17, 2008.

"BEA WebLogic Workshop 8.1," 2005 BEA Systems, Inc., <<http://www.bea.com/framework.jsp?CNT=demos.htm&FP=/content/products/workshop/learn>>, available as early as Nov. 1, 2007.

Bederson et al, "DateLens: A Fisheye Calendar Interface for PDA's," ACM Transactions on Computer-Human Interaction, 11(1), Mar. 2004, pp. 90-119.

Cruz et al, "A Visual Tool for Ontology Alignment to Enable Geospatial Interoperability," Journal of Visual Languages and Computing, 18(2007), pp. 230-254.

"Extensible Markup Language (XML)," W3C, <<www.w3.org/XML>>, retrieved o Mar. 28, 2005.

Kay,"XSLT Programmer's Reference, 2nd Edition, " Wrox Press Ltd, Birmingham, UK, 2000, pp. 11-49.

Lau et al, "Developing XML Web Services With WebSphere Studio Application Developer," IBM Systems Journal, 41 (2), 2002, pp. 178-197.

Lee et al, "Favorite Folders: A Configurable, Scalable File Browser," UIST 2003 Conference Supplement, Nov. 2003, pp. 45-46.

"MapForce 2005," Altova, n.d., <<http://www.altova.com/features_xml2xml_mapforce.html>>, retrieved Mar. 28, 2005.

"Mapping Between Schemas: BizTalk," 2004, Microsoft Corporation, <<http://msdn.microsoft.com/library/en-us/introduction/htm/ebiz_intro_story_gtg.asp>>, retrieved on Mar. 28, 2005.

Robertson et al, "Animated Visualization of Multiple Intersecting Hierarchies," Journal of Information Visualization, 1(1), Mar. 2002, pp. 50-65.

Robertson et al, "Cone Trees: Animated 3D Visualizations of Hierarchical Information," ACM, Proceedings of the SIGCHI Conference on Human Factors in Computing Systems: Researching Through Technology, New Orleans, Louisiana, Apr.-May, 1991, pp. 189-194.

Schneiderman, "Dynamic Queries for Visual Information Seeking," IEEE Software, 11(6), Nov. 1994, pp. 70-77.

"Sonic Integration Workbench," 2004, Sonic Software Corporation, <<http://www.sonicsoftware.com/products/docs/integration_workbench_0604.pdf>>, Jun. 2004.

"TIBCO BusinessWorks," TIBCO Software Inc., <<http://www.tibco.com/resources/software/business_integration/businessworks.jsp>>, retrieved on Mar. 28, 2005.

"TreeView Class," Microsoft, <<http://msdn.microsoft.com/library/en-us/cpref/html/frlrfsystemwindowsformstreeviewclasstopic.asp>>, retrieved on Mar. 28, 2005.

"Visual XSLT," ActiveState, n.d., <<http://www.activestate.com/Products/Visual_XSLT>>, retrieved on Mar. 28, 2005.

"Web Services Tutorials," CapeScience, n.d., <<http://www.capescience.com/education/tutorials/index.shtml#cc5>>, retrieved on Mar. 28, 2005.

"XSLT Mapper," Stylus Studio, n.d., <<http://www.stylussudio.com/xst_mapper.html>>, retrieved on Mar. 28, 2005.

* cited by examiner

SCHEMA MAPPER

CROSS-REFERENCE TO RELATED APPLICATIONS

This application is a divisional of U.S. patent application Ser. No. 11/035,695, filed Jan. 14, 2005, and issued as U.S. Pat. No. 7,478,079 on Jan. 13, 2009, entitled, "SCHEMA MAPPER", the entirety of which is incorporated herein by reference.

FIELD OF THE INVENTION

In general, the present invention is related to the visualization of mappings, and in particular to the visualization of mappings between multiple schemas.

BACKGROUND OF THE INVENTION

A common problem in electronic business applications is transforming data from one Extensible Markup Language ("XML") schema into another. For example, data may come into a company in some industry-standard schema that needs to be transformed into a company-specific and/or need-specific schema. Typically, this is done with an eXtensible Stylesheet Language: Transformations ("XSLT") style sheet. However, for complex schemas and mappings, defining an XSLT style sheet is very difficult.

One technique for resolving this problem is by visually building a graphical representation of the mappings from a source schema to a destination schema. For example, FIG. 1 shows a pictorial diagram 100 of a graphical representation of mappings between a source schema 101 and destination schema 103. The source schema 101 is on the left, the destination schema 103 is on the right, and the mapping 105 is represented between them. Mappings between schemas may be graphically represented by a network of functoids (functional operations) connected by links to schema elements and other functoids. A functoid, as used herein, is a graphical representation any functional operation that may be used in transforming a source schema into a destination schema. Once a mapping between two schemas 101, 103 is graphically defined, an XSLT style sheet may be compiled for use.

While the existing graphical representation techniques, such as that depicted in FIG. 1, work for representing the mappings between simple schemas, they do not scale well to larger schemas. For example, FIG. 2 is a pictorial diagram 200 of a graphical representation of a mapping between a source schema 201 and a destination schema 203, using an existing visualization technique. The details of interest, e.g., the mapping 205 between the source schema 201 and the destination schema 203, become lost in a maze of complexity. Current techniques allow a user to select a schema element, link, or functoid, but only the selected item is highlighted. For example, if a user selects source schema element "ns2:id" 201A, that source element is highlighted but the links expanding from that element, any functoids, and the destination schema element(s) are not highlighted. This means that to find a relationship between a source schema element and a destination schema element, a user must make several selections and potentially scroll both schemas and the map in order to establish a reasonable view. For large mappings, such as that depicted in FIG. 2, this becomes very difficult and the potential of selecting the wrong link, or not following all links, increases.

Accordingly, there is a need for a system and method that allows users to effectively visualize and map schemas regardless of the scale or size of the schemas or the mappings and to allow a user to visually determine the mappings between a source schema and a destination schema.

SUMMARY OF THE INVENTION

Embodiments of the present invention provide the ability to effectively visualize the mapping between two schemas, regardless of the size or complexity of the schemas and mappings. According to one aspect of the present invention, a method for visually representing a mapping between a first schema and a second schema is provided. The method includes receiving a selection of an object, emphasizing the selected object and identifying a plurality of objects that are relevant to the selected object. The objects that are identified as being relevant to the selected object are also emphasized.

In accordance with another aspect of the present invention, a computer system having a computer-readable medium including a computer-executable program therein for performing the method of displaying a mapping between a first schema and a second schema is provided. The computer system performs the method of receiving a selection of an object and identifying a plurality of objects relevant to the selected object, wherein at least one of the relevant objects and the selected object is a first schema element, at least one of the relevant objects and the selected object is a second schema element, and at least one of the relevant objects and the selected object is part of the mapping. The relevant objects are auto-scrolled to a center point with respect to the selected object. Additionally, each of the relevant objects and the selected object are emphasized.

In accordance with another aspect of the present invention, a method for displaying a mapping between a first schema and a second schema is provided. The method identifies a plurality of relevant objects, wherein at least one of the plurality of relevant objects is a first schema element and at least one of the plurality of the relevant objects is a second schema element. Additionally, the method identifies a non-linked non-relevant element in the first schema and determines if a descendent of the non-linked non-relevant element has a link. If it is determined that the descendant of the non-linked non-relevant element does not have a link, the non-linked non-relevant element and the descendent of the non-linked non-relevant element are coalesced. The coalesced elements may then be displayed as a single graphical representation.

In accordance with still another aspect of the present invention, a computer system having a computer-readable medium including a computer-executable program therein for performing the method of displaying a tree view representation of a plurality of objects is provided. The method includes receiving a selection of an object and auto-scrolling the tree view representation of a plurality of objects to a position where a representation of the selected object is included in a display.

In accordance with another aspect of the present invention, a method for displaying a tree view of a plurality of objects is provided. The method includes identifying a first relevant object and a second relevant object, identifying a non-relevant object, and determining if a descendent of the non-relevant object is relevant. If it is determined that the descendant of the non-relevant object is not relevant, the non-relevant object and the descendent of the non-relevant object are coalesced. The coalesced objects are displayed as a single graphical representation.

In accordance with still another aspect of the present invention, a method for representing a plurality of objects is provided. The method includes, displaying a tree view representation of a plurality of objects, receiving a selection of an object of the plurality of objects, and displaying a marker representative of the selected object.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the present invention provide the ability to effectively visualize the mapping between two schemas, referred to herein as a source schema and a destination schema, regardless of the size or complexity of the schemas and mappings. According to one embodiment, the approach to visualizing large schemas and mappings is to graphically focus on relevant objects of interest and graphically de-emphasize or remove objects of lesser relevance for a particular interaction. As will be described in more detail below, there are several different techniques that may be used to efficiently visualize mappings between schemas including, but not limited to, emphasis propagation, auto-scrolling, coalescing, multi-select, incremental searching, and bendable links. Each of these techniques may be used alone or in combination.

Figure 1:
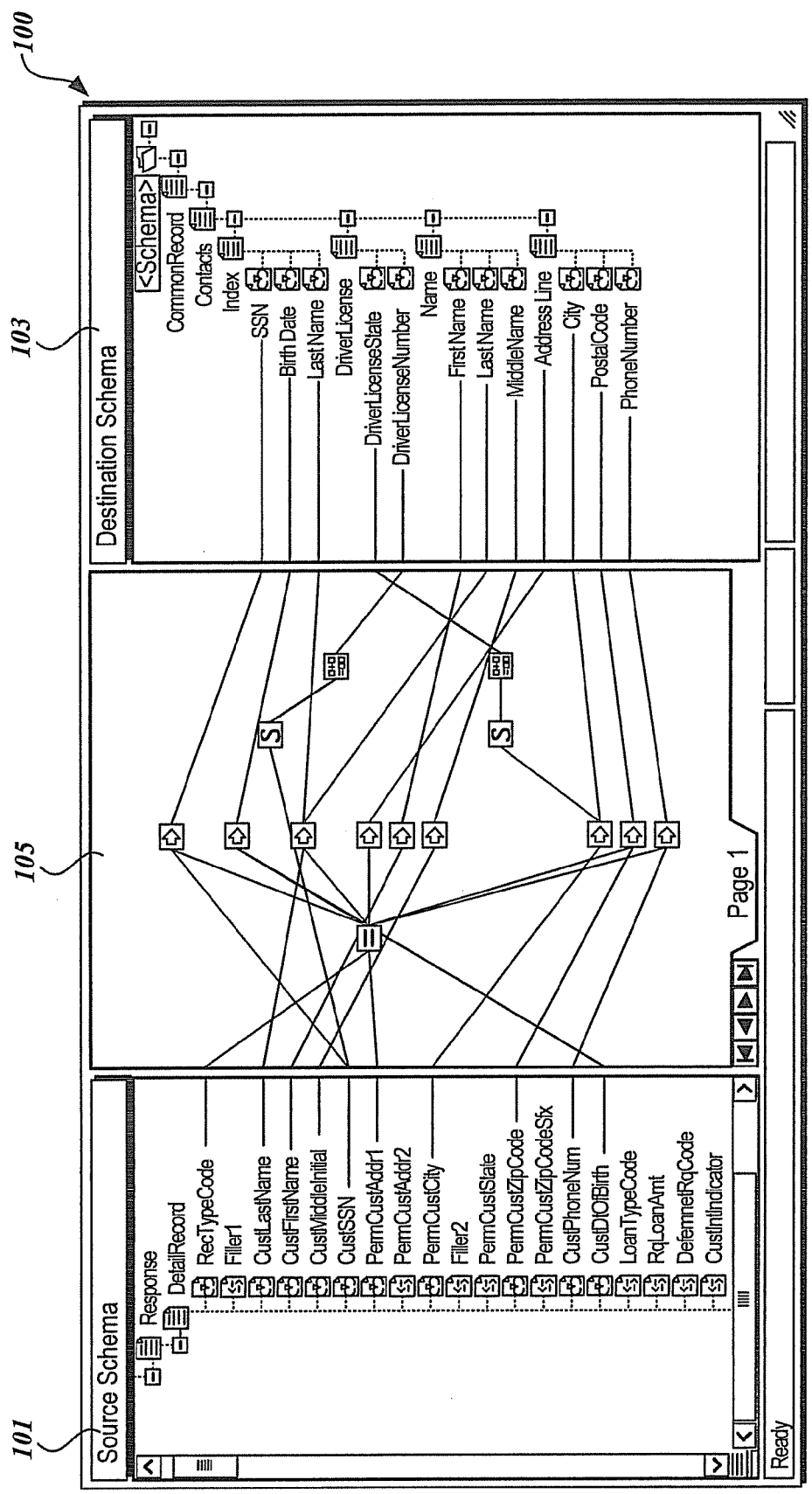
FIG. 1 is a pictorial diagram of a graphical representation of mappings between a source schema and destination schema, using an existing visualization technique.
Figure 2:
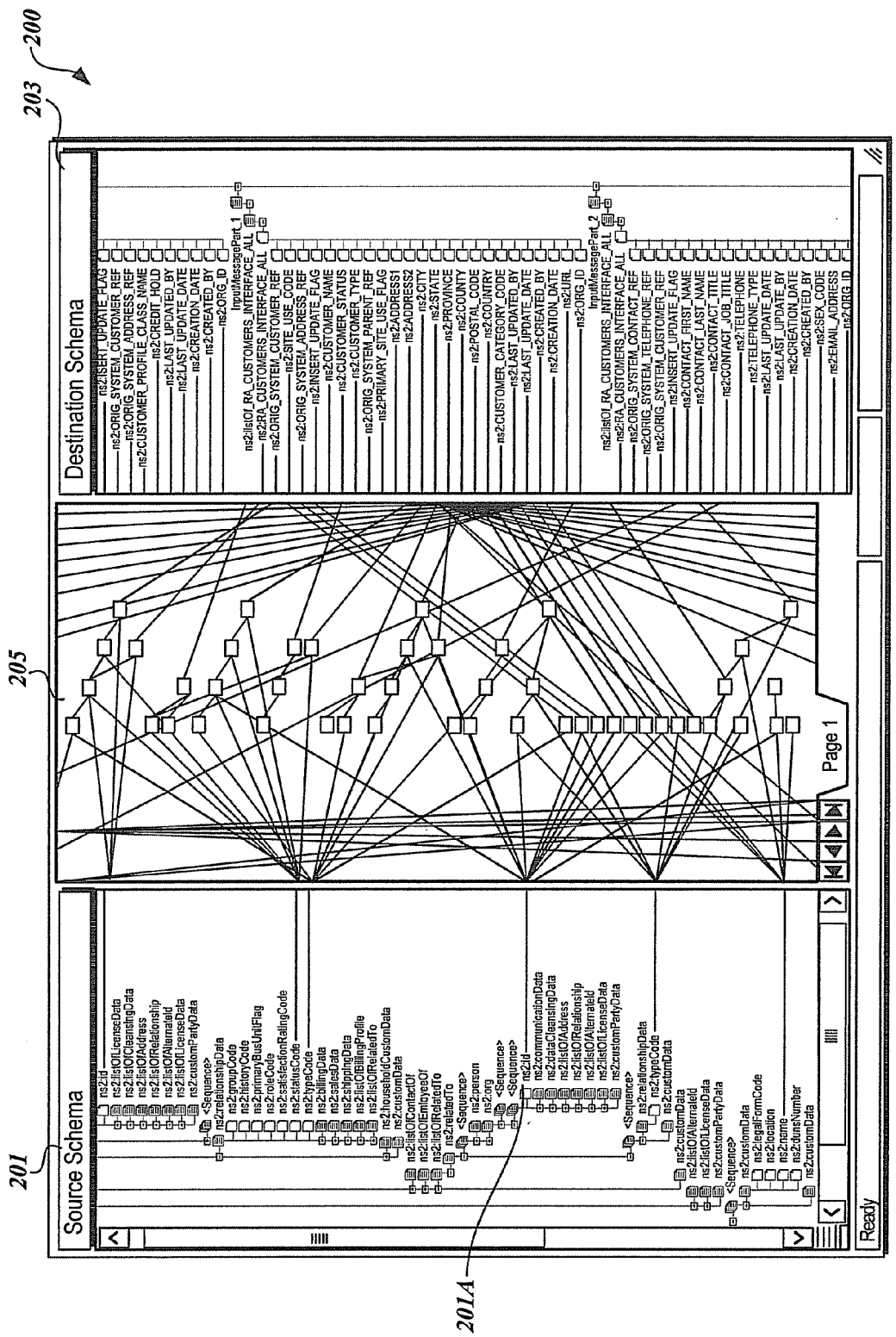
FIG. 2 is a pictorial diagram of a graphical representation of mappings between a source schema and a destination schema, using an existing visualization technique.
Figure 3:
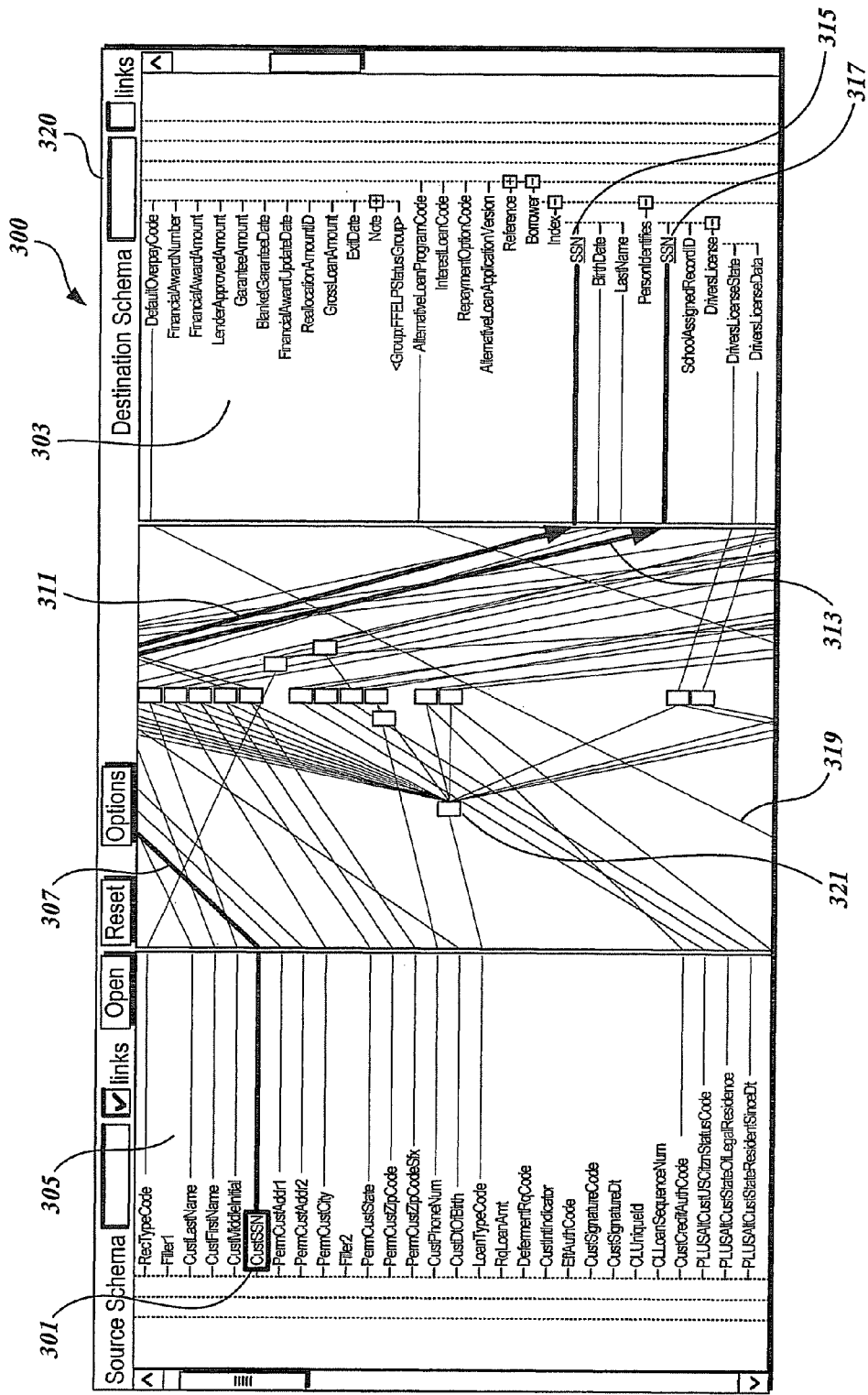
FIG. 3 is a pictorial diagram of a schema mapping display generated using emphasis propagation to graphically represent mappings between a source schema and a destination schema, in accordance with an embodiment of the present invention.

FIG. 3 is a pictorial diagram of a schema mapping display generated using emphasis propagation to visualize the mappings between a source schema and a destination schema, in accordance with an embodiment of the present invention. In an embodiment of the present invention, objects of a schema, such as source schema 305 and destination schema 303, may be graphically represented in the form of a "tree view." A tree view, as used herein, is a hierarchical representation of objects, identifying each objects relationship with respect to one another. For example, referring briefly to FIG. 7, the object Responses is the parent of the objects HeaderRecord, Response, etc. Other graphical representation techniques may be utilized to represents schemas and the use of a tree view is provided only as an example. However, as will be described in more detail below, several aspects of the present invention provide advancements in the use of a tree view.

When a user selects a graphical representation of an object, the selected object is emphasized. An object, as referred to herein, is a graphical representation of any schema element, link, functoid or other item that may be used in mapping two schemas. Emphasizing an object, as used herein, means to visually adjust the graphical representation of the object such that it is visually distinguishable from other objects. For example, emphasizing an object may include, but is not limited to, highlighting, underlining, increasing the font size, thickness, or orientation, enclosing the object in a box or circle, etc.

Additionally, all links that are relevant to the selected object are followed in both directions, and every schema element, link, and functoid that is relevant to the selected object is emphasized as well. An object is considered relevant to another object if the two are connected, directly or indirectly, by a link or a functoid. For example, if a user selects source schema element "CustSSN" 301, that element is emphasized and the representations of all links, functoids and destination schema elements that are relevant to CustSSN 301 are also emphasized. In this example, links 307, 311, and 313 and destination schema elements "SSN" 315, and "SSN" 317 are relevant, and thus emphasized.

In addition to emphasizing relevant objects, all non-relevant objects may be de-emphasized. Non-relevant objects are those objects that were not emphasized as being relevant to a selected object. For example, link 319 and functoid 321 may be de-emphasized as they are not relevant to selected source element "CustSSN" 301. De-emphasizing an object may include, but is not limited to, changing color, decreasing font size, decreasing line thickness, or making the object semi-transparent. De-emphasizing non-relevant objects and emphasizing relevant objects provides a further visual distinction to a user as to what objects are relevant to a selected object. This is particularly useful in large complex mappings to help a user determine the mapping relationship between a source schema 305 and a destination schema 303.

While emphasizing/de-emphasizing objects enhances a user's experience and helps visually illustrate the mapping between schemas, in some examples one or more of the relevant objects may not be within a display area 320. For example, relevant links 307, 311, and 313 each extend beyond the display area 320. Thus, embodiments of the present invention may also automatically adjust what is viewable within the display area 320 (auto-scroll) to bring additional relevant objects into a user's view.

Figure 4:
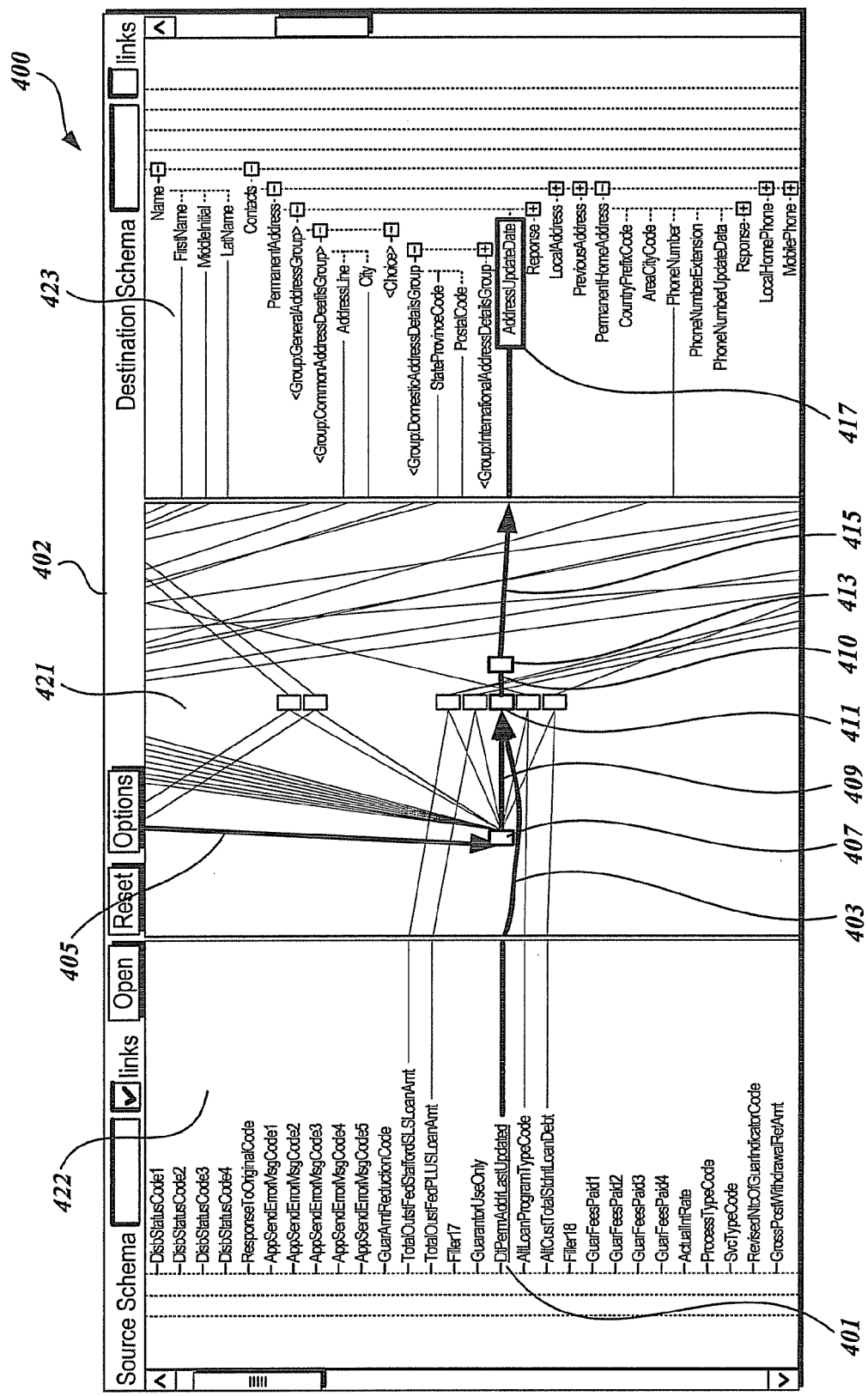
FIG. 4 is a pictorial diagram of a schema mapping display generated using emphasis propagation, auto-scrolling, and bendable links to graphically represent the mappings between a source schema and a destination schema, in accordance with an embodiment of the present invention.

FIG. 4 is a pictorial diagram of a schema mapping display generated using emphasis propagation, auto-scrolling, and bendable links to graphically represent the mappings between a source schema and a destination schema, in accordance with an embodiment of the present invention. In such an embodiment, upon selection of an object, e.g., "DtPermAddrLastUpdated" 401, that object is emphasized and all relevant objects, such as links 403, 405, 409, 410, 415, functoids 407, 411, 413, and destination schema elements "AddressUpdateDate" 417 are also emphasized. Additionally, the map 421 is auto-scrolled so that a mid-point between the top-most and bottom-most relevant functoids is horizontally centered with the position of the selected schema element 401. As will be appreciated by one of skill in the relevant art, any point in the map 421 may be selected for use in auto-scrolling. For example, the bottom-most or top-most highlighted functoids may be centered on the center of the display area or centered on the selected object.

In addition to auto-scrolling the map 421 to some centering point, the path from a selected object to the destination schema element(s) and the source schema element(s) may be centered, so that each relevant object (link, functoid, element) is appropriately centered. Alternatively, each relevant object may be moved so that the next object in the path is centered on that path. If there are more than two functoids at the same vertical position in the mapping (i.e., in the same column), alignment with the path will only be performed for one of the functoids. For example, the top-most relevant functoid in each column may be aligned with the path. In an alternative embodiment, the centering may be done for the lowest-most emphasized functoid. As will be appreciated by one of skill in the relevant art, centering may be performed for any functoid in a column and discussions of using the top-most or bottom-most functoids are provided only as examples. The result is that the entire selected path is centered on the originally selected schema element.

Referring back to FIG. 4, each of the three functoids 407, 411, 413 that are relevant to selected element "DtPermAddrLastUpdated" 401 are aligned so that the entire path is centered. In particular, functoid 407 is aligned with the selected element 401, functoid 411 is aligned with functoid 407 and functoid 413 is aligned with functoid 411.

Additionally, embodiments of the present invention provide the ability for a user to clearly determine whether a link passes through a functoid by bending links if necessary. For example, link 403 has been bent to go around functoid 407 so that a user does not mistakenly believe that it connects to functoid 407. As the user manipulates the map 421 and/or the schemas 422 and 423 the emphasized links are bent as necessary to avoid passing through a non-connected functoid.

In addition to centering functoids, schema elements that are relevant to a selected object may also be centered. If there are multiple schema elements in the same schema that are relevant to a selected object, those schema elements may be centered so that the largest number of relevant elements possible are included in the user display area 402. For example, the source schema 422 is represented in a tree view form, that tree view may be auto-scrolled so that the relevant element DePermAddrLastUpdated 401 is centered vertically in the display area 402. Additionally, if one of the schema elements is the selected object, that object may always be kept in the user display and the schema centered so that the selected element and the largest number of other elements from that schema are included in the display.

Figure 5:
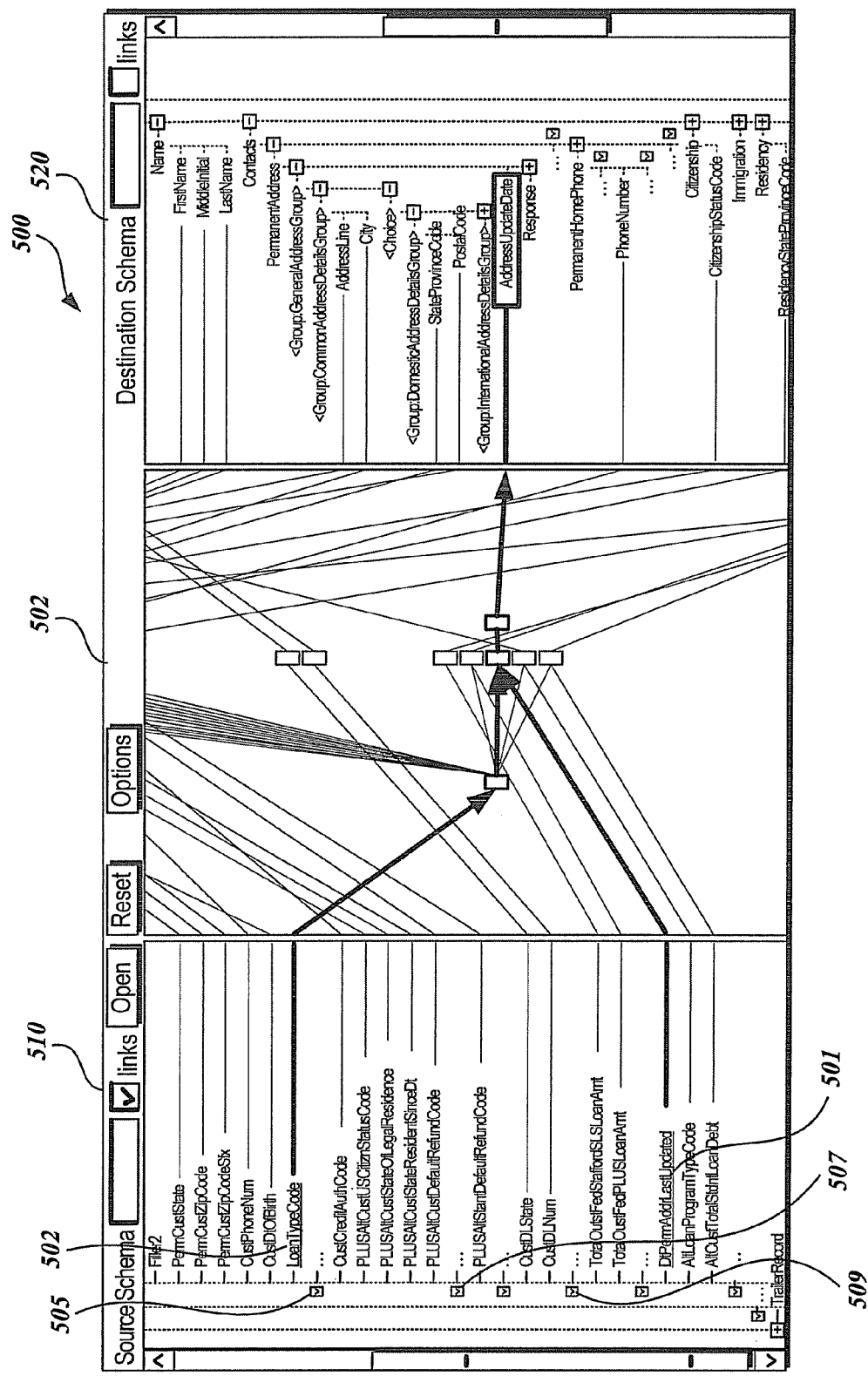
FIG. 5 is a pictorial diagram of a schema mapping display generated using emphasis propagation, auto-scrolling, and coalescing to graphically represent the mappings between a source schema and a destination schema, in accordance with an embodiment of the present invention.

While auto-scrolling of the map and schemas may bring all relevant objects into the user display area 402, for large schemas, relevant objects may still remain out of the display. For example, in FIG. 4, one of the relevant links 405 extends beyond the display 400. To further reduce the problem of relevant objects not being included in the display, embodiments of the present invention may coalesce schema elements. For example, FIG. 5 is a pictorial diagram of a schema mapping display generated using emphasis propagation, auto-scrolling, and coalescing to visually represent the mappings between a source schema and a destination schema, in accordance with an embodiment of the present invention. As described in more detail below, the non-relevant elements of the source schema 510 and the non-relevant elements of the destination schema 520 are coalesced and may be represented collectively in a tree view by a graphical icon, such as an arrow 505. In determining which elements of a tree view to coalesce, it is determined whether an element or any of its descendants have a link (relevant or non-relevant). If the element and its descendants do not have links, the elements are coalesced and represented collectively.

This process, as described in more detail below with respect to FIG. 11, continues until all relevant elements are positioned within the display 500, or until all elements without links have been coalesced. Additionally, if, after coalescing non-linked elements, the relevant elements are still not included in the display 502, it may further be determined if there are any non-coalesced elements that are not relevant and if so, whether any descendants of a non-coalesced non-relevant element are relevant. If there are non-coalesced, non-relevant elements whose descendants are also not relevant, those elements may also be coalesced and represented collectively in a tree view as a single graphical icon.

Figure 6:
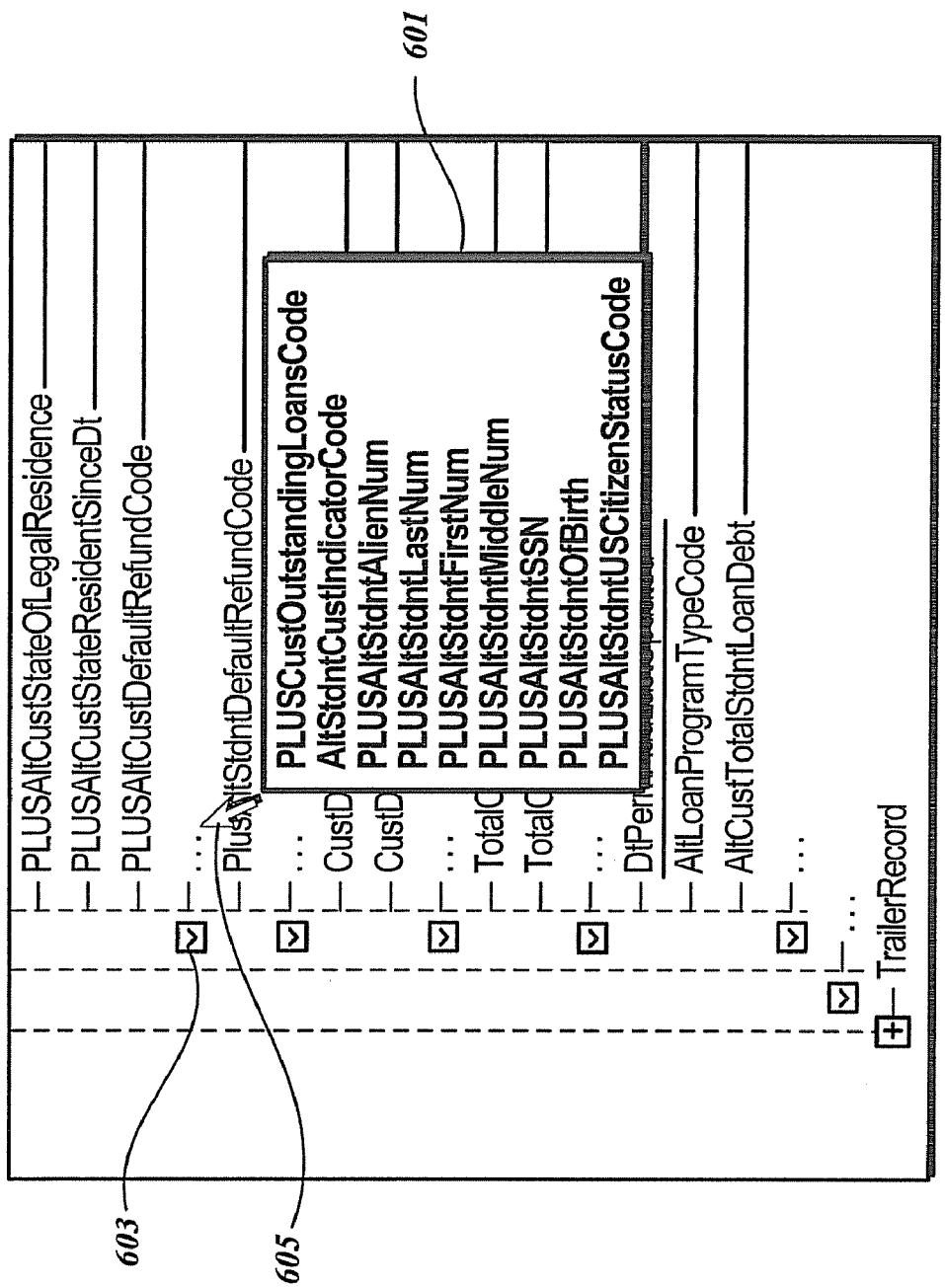
FIG. 6 illustrates a close-up view of a pop-up window 601 that may be displayed to a user when the user positions a pointing device 605 over a graphical icon 603 that represents coalesced elements, in accordance with an embodiment of the present invention.

Referring to FIG. 5 all of the non-linked elements between element "LoanTypeCode" 502 and "DtPermAddrLastUpdated" 501 are coalesced so that both of those elements could be included in the display 500. The coalesced elements may be represented in the tree view of the source schema by a graphical icon, such as down arrow buttons 505, 507, 509 to illustrate to a user where in the tree view of the schema elements have been coalesced. Additionally, by positioning a pointing device, such as a mouse pointer, over a graphical icon, a visual representation, in the form of a pop-up window, of the coalesced elements may be provided. For example, FIG. 6 illustrates a close-up view of a pop-up window 601 that may be displayed to a user when the user positions a pointing device 605 over a graphical icon 603 that represents coalesced elements, in accordance with an embodiment of the present invention. Additionally, a user may select the graphical icon and the coalesced elements will be expanded and displayed in the tree view of the schema in their original position. For icons, such as the down arrow, that represents coalesced elements, if the user selects the down arrow, the coalesced elements are displayed in the tree view, and the graphical icon may visually change to an up-arrow. If the user selects the up-arrow, the elements may be re-coalesced.

Referring back to FIG. 5, it can be seen that there are several graphical representations of different sets of coalesced elements. Providing several representations instead of coalescing all elements under one graphical icon illustrates to the user the original arrangement of the tree view of the schema. Maintaining the original tree view arrangement of a schema is an important feature, as the arrangement generally has relevance to the user.

Figure 7:
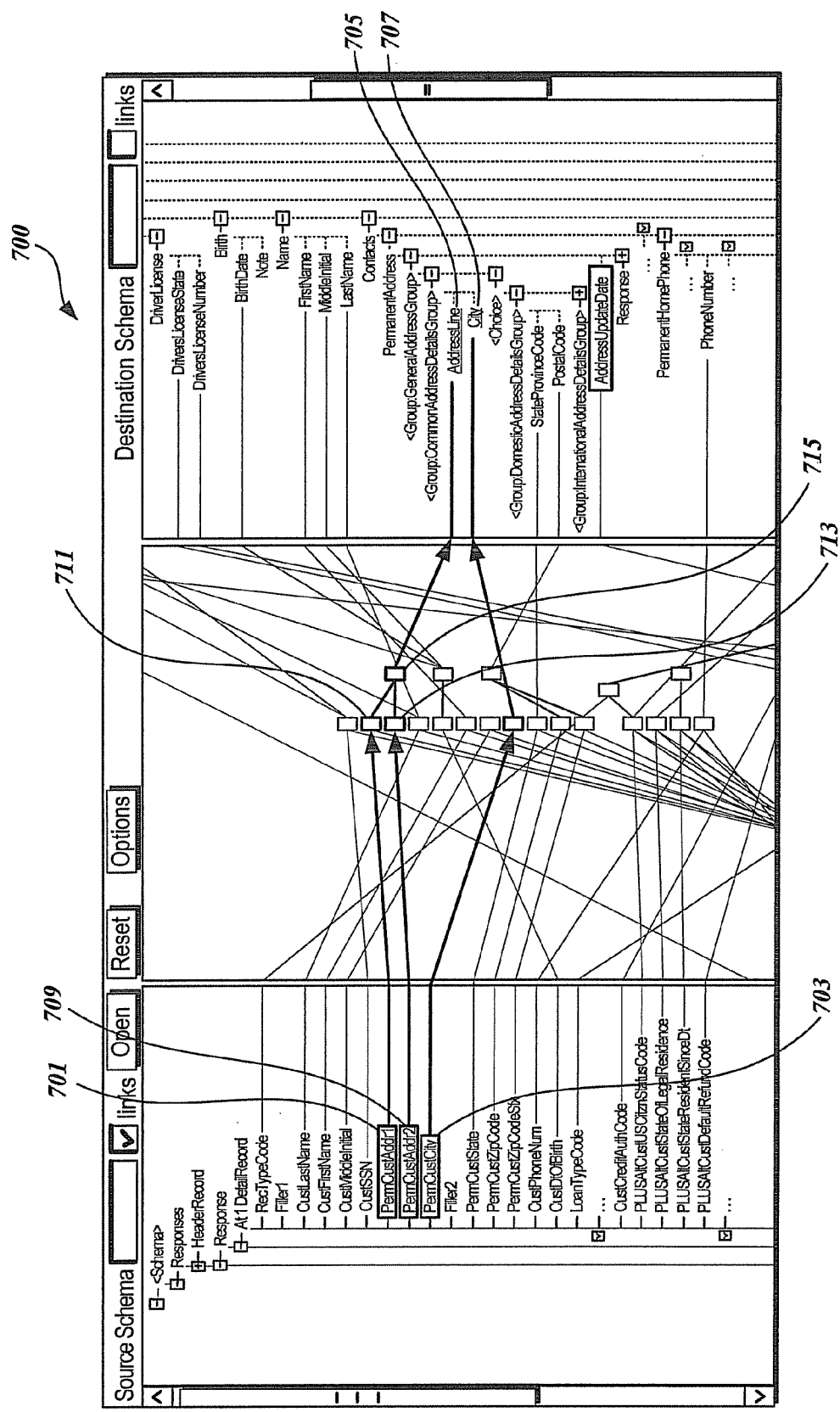
FIG. 7 is a pictorial diagram of a schema mapping display, illustrating the multiple selection of objects, in accordance with an embodiment of the present invention.

Embodiments of the present invention also provide a user with the ability to select multiple objects (multi-select) to visualize how those objects interact with respect to one another. For example, FIG. 7 is a pictorial diagram of a schema mapping display 700, illustrating the multiple selection of objects, in accordance with an embodiment of the present invention. A user may select multiple objects, such as source schema element "PermCustAddr1" 701 and "PermCustCity" 703 and the above visualization techniques (emphasis propagation, auto-scrolling, coalescing, and link bending) will be used to represent the mappings of each selected object. Providing the ability to select multiple objects allows a user to visualize how different objects are related. Continuing with the example presented in FIG. 7, the display 700 represents to a user that the selected source schema elements 701, 703, and 709, represented in the tree view of the source schema, map to destination schema elements "AddressLine" 705 and "City" 707.

Figure 8:
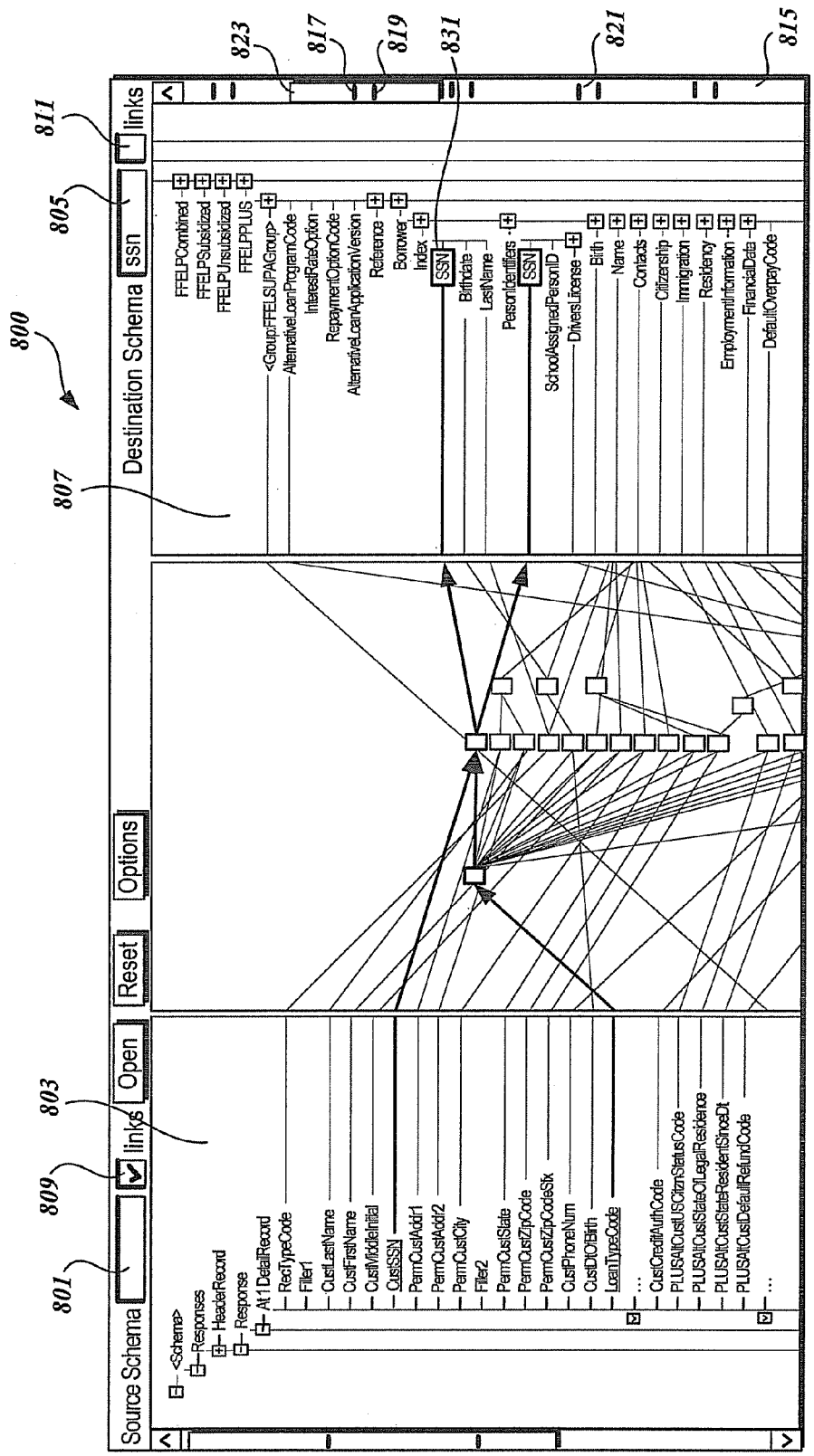
FIG. 8 is a pictorial diagram of a schema mapping display illustrating the ability for a user to incrementally search for objects, in accordance with an embodiment of the present invention.

In addition to providing efficient visualization of mappings between a source schema and a destination schema, using any one of, or combination of, the above described techniques, embodiments of the present invention also provide the ability for a user to search for objects and have those objects presented in a display. FIG. 8 is a pictorial diagram of a schema mapping display 800 illustrating the ability for a user to incrementally search for objects, in accordance with an embodiment of the present invention. The display 800 includes a search box 801 for the source schema 803 and a search box 805 for the destination schema 807. In an alternative embodiment, an additional search box may be included for use in searching both schemas concurrently. Option boxes 809, 811 may be selected or de-selected to indicate whether a search should be performed on all elements of the schema or only on elements that are linked. As will be appreciated by one of skill in the relevant art, the use of searching, as described herein, may be utilized to enhance any type of tree view representation of objects and is not limited to the tree view representation of a schema.

In one embodiment, the search may be incremental, in that it shows the results after each keystroke typed into a search box 801, 805. The visualization techniques described above may be used to orient objects matching a search in the display 800. FIG. 8 is a pictorial diagram of a display 800 that includes the results of a search for "SSN" performed on the destination schema 807. The destination schema is searched and all elements that include SSN are emphasized. Additionally, objects that are relevant to the matching objects may also be identified and emphasized. The mappings from the elements matching the search and the related objects may also be centered in the display using any one of, or combination of, the techniques discussed above.

Still further, matching elements may also be represented graphically in the scrollbar 815. For example, each element that includes "SSN" may be represented in the scrollbar 815 by a marker, such as markers 817, 819, and 821, regardless of whether the elements are located in the display 800. The markers are oriented on the scrollbar 815 with respect to the represented elements location in the schema. For example, marker 817 represents destination schema element 831 and is positioned over the slider 823. The slider 823 represents the displayed portion of the destination schema. Marker 821 represents a destination schema element that is further down in the destination schema and not included in the display 800. As such, the marker 821 is represented on the scroll bar 815 below the slider 823.

In an embodiment of the present invention, the markers may be interactive. For example, if a user positions a pointing device over a marker, a marker window is presented that describes the element represented by the marker. A marker window is similar to the pop-up window described with respect to FIG. 7. In particular, the marker window identifies the schema element represented by the marker. Additional information may also be included in the marker window. For example, the marker window may also identify the objects relevant to the element represented by the marker and optionally include a graphical representation of the mappings of the objects relevant to the element represented by the marker. Additionally, if a user selects a marker, an animated scroll will bring the element represented by the selected marker into the display 800. Additionally, the element corresponding to the selected marker is emphasized, and the emphasis is propagated to all objects relevant to that element. Relevant objects may also be positioned within the display 800 using the auto-scroll and coalescing techniques described above.

The markers may also be color coded. For example, blue markers may represent elements that are currently selected and red markers may represent elements that match the search that are not selected. Alternatively solid markers may represent selected elements and dashed elements may represent non-selected elements. Any distinguishment technique may be used with an embodiment of the present invention.

Figure 9:
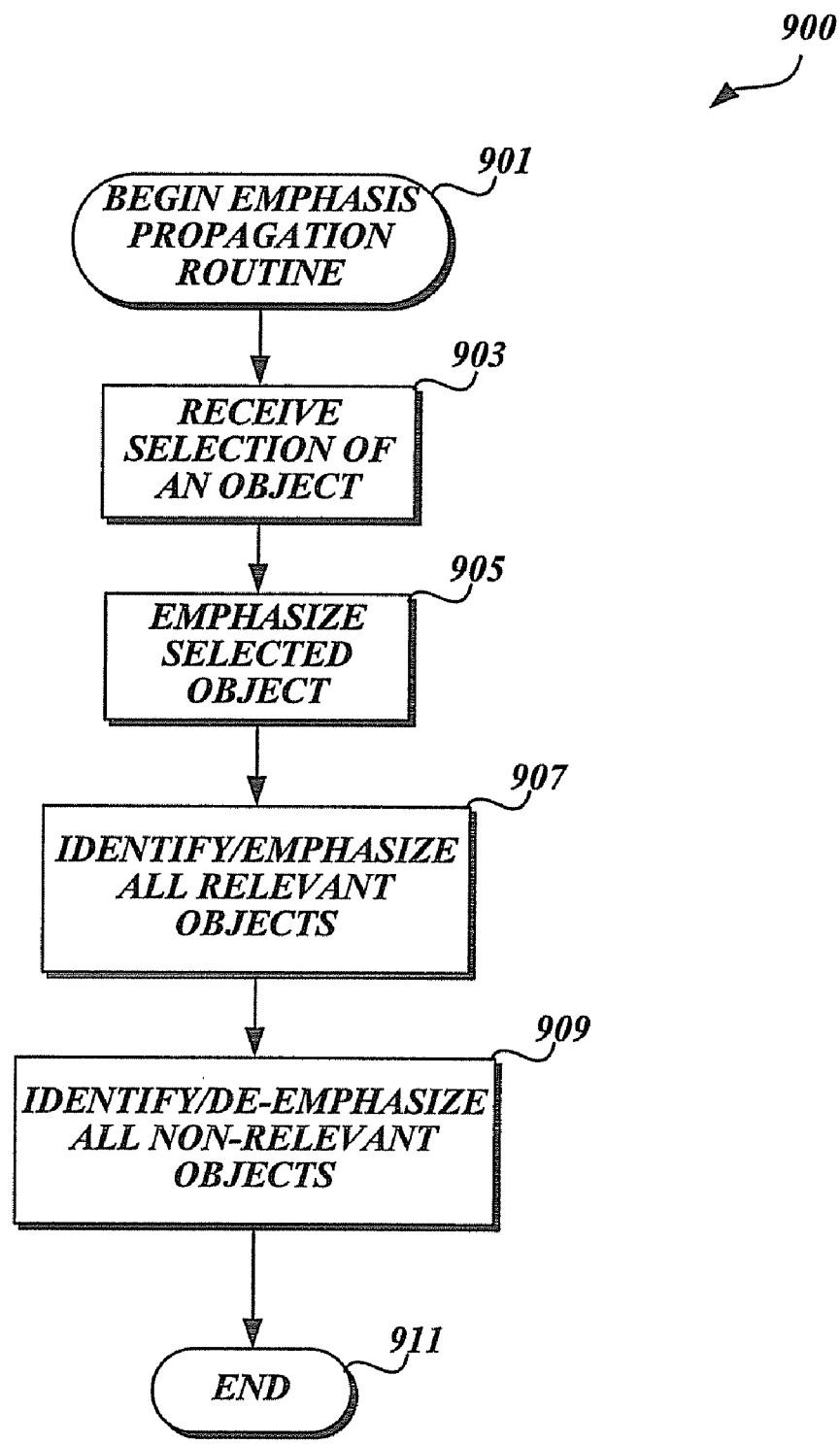
FIG. 9 is a block diagram of an emphasis propagation routine for emphasizing relevant objects, in accordance with an embodiment of the present invention.

FIG. 9 is a block diagram of an emphasis propagation routine for emphasizing relevant objects, in accordance with an embodiment of the present invention. The emphasis propagation routine 900 begins at block 901 and at block 903 a selection of an object is received. At block 905, the selected object is emphasized. As discussed above, an object may be emphasized by highlighting the object, bolding the object, underlining the object, or adding any type of distinguishing characteristic to the selected object in order to distinguish it from other objects in a display.

In addition to emphasizing a selected object, the emphasis propagation routine 900, identifies all objects that are relevant to the selected object, as illustrated by block 907. A relevant object is any object, such as a functoid, source schema element, destination schema element, or link, that is in the path of a selected object. Identification of relevant objects may be accomplished in a variety of techniques. For example, beginning at a selected object, the routine 900 may determine all objects in a path(s) leading into the selected object, if such a path exists. If there are any objects in an incoming path, those objects are emphasized. As illustrated in FIG. 4, there may be more than one path leading into an object, each path is relevant to the selected object and thus, each object (e.g., link, functoid, element) in each path is emphasized. For example, if the selected object is a functoid 413 (FIG. 4), the routine identifies that the incoming path of link 410 includes a functoid 411 that branches into two paths, represented by links 403, 409. Each path is followed and all objects of all paths leading into the functoid 413 are followed and all objects in those paths are emphasized. This identification and emphasizing process continues until all paths leading into the selected object have been identified and emphasized.

In addition to identifying all paths into a selected object, the routine also determines all paths leading out of the selected object. Paths leading out of a selected object are also relevant and those paths, and the objects in those paths, are emphasized. For example, the routine determines that the path leading out of functoid 413 includes link 415 and element 417. Both link 415 and element 417 are thus emphasized because they are relevant to functoid 413.

In addition to identifying and emphasizing all objects that are relevant to a selected object, at block 909 the routine identifies and de-emphasizes all non-relevant objects. Non-relevant objects are any objects that were not identified in block 907 as being in the path of the selected object. An object may be de-emphasized by graying out the object in the display, shrinking the size of the object, or performing any other display technique on the non-relevant objects to indicate that they are not currently relevant. The emphasis propagation routine 900 completes at block 911.

Figure 10:
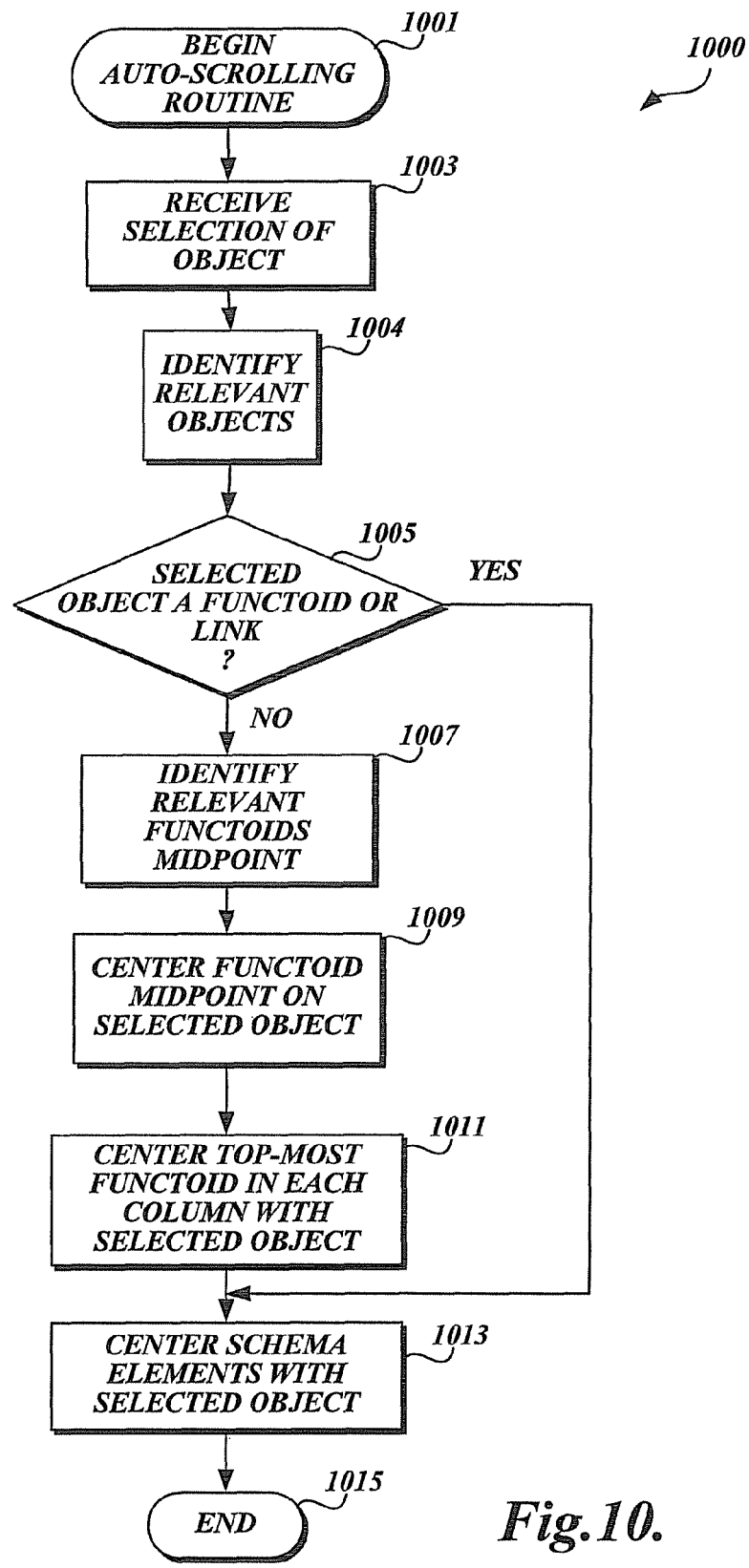
FIG. 10 is a block diagram of an auto scrolling routine for adjusting the display of a schema mapping, in accordance with an embodiment of the present invention.

FIG. 10 is a block diagram of an auto scrolling routine for adjusting the visual representation of schema mappings, in accordance with an embodiment of the present invention. The auto scrolling routine 1000 begins at block 1001 and at block 1003 receives a selection of an object. At block 1004, all objects that are relevant to the selected object are identified. Identification of relevant objects may be obtained from the propagation routine 800 (FIG. 8), if performed, or identified using the identification techniques discussed with respect to FIG. 8. At decision block 1005, a determination is made as to whether the selected object is a functoid or a link. If it is determined at decision block 1005 that the selected object is not a functoid or link, at block 1007, a relevant functoid midpoint is identified. A midpoint of relevant functoids is determined by identifying the top most relevant functoid and the bottom most relevant functoid and calculating a point directly between those two functoids. If there is only one relevant functoid, that functoid is used as the functoid midpoint. As will be appreciated by one of skill in the relevant art, any point other than a midpoint may also be used with embodiments of the present invention for centering relevant functoids.

At block 1009, the relevant functoids are centered by aligning the identified midpoint in a horizontal plane with the selected object. The centering operation may be animated over a specified time period, for example one second. In addition to centering the functoid midpoint with a selected object, in an embodiment to the present invention, the columns of functoids may also be auto scrolled to bring any additional relevant functoids into the display. To center columns of relevant functoids, the path into and out of a relevant functoid is centered horizontally with the selected object. If there are multiple functoids in the same column, only the top most functoid is centered. The end result is that the relevant path is centered on the selected object. The centering of the columns may also be animated over a period of time. For example, the centering of the columns may be animated over the same time period as the animation performed at block 1009. As will be appreciated by one of skill in the relevant art, any functoid in a column of functoids may be used for centering the path and the discussion of using the top most functoid in a column is provided as an example only.

In addition to centering the schema map, as accomplished by blocks 1007-1011, the source schema elements and the destination schema elements may also be centered, as illustrated by block 1013. For example, schema elements represented in the form of a tree view may be centered so that the relevant elements are centered in the display. The schema elements may be centered based on the number of relevant elements and based on whether one of the elements is the selected object. In particular, the tree view of the schema elements may be auto-scrolled to position the largest number of relevant elements into the display. If one of the elements is the selected element, the auto-scrolling may only scroll to the extent that the selected element remains on the display. The centering of schemas may also be animated over a period of time. For example, the centering of the schemas may be animated over the same period of time as the animation performed at block 1009. At block 1015, the auto scrolling routine 1000 completes. As will be appreciated by one of skill in the relevant art, the use of auto-scrolling, as described herein, may be utilized to enhance any type of tree view representation of objects and is not limited to the tree view representation of a schema.

Figure 11:
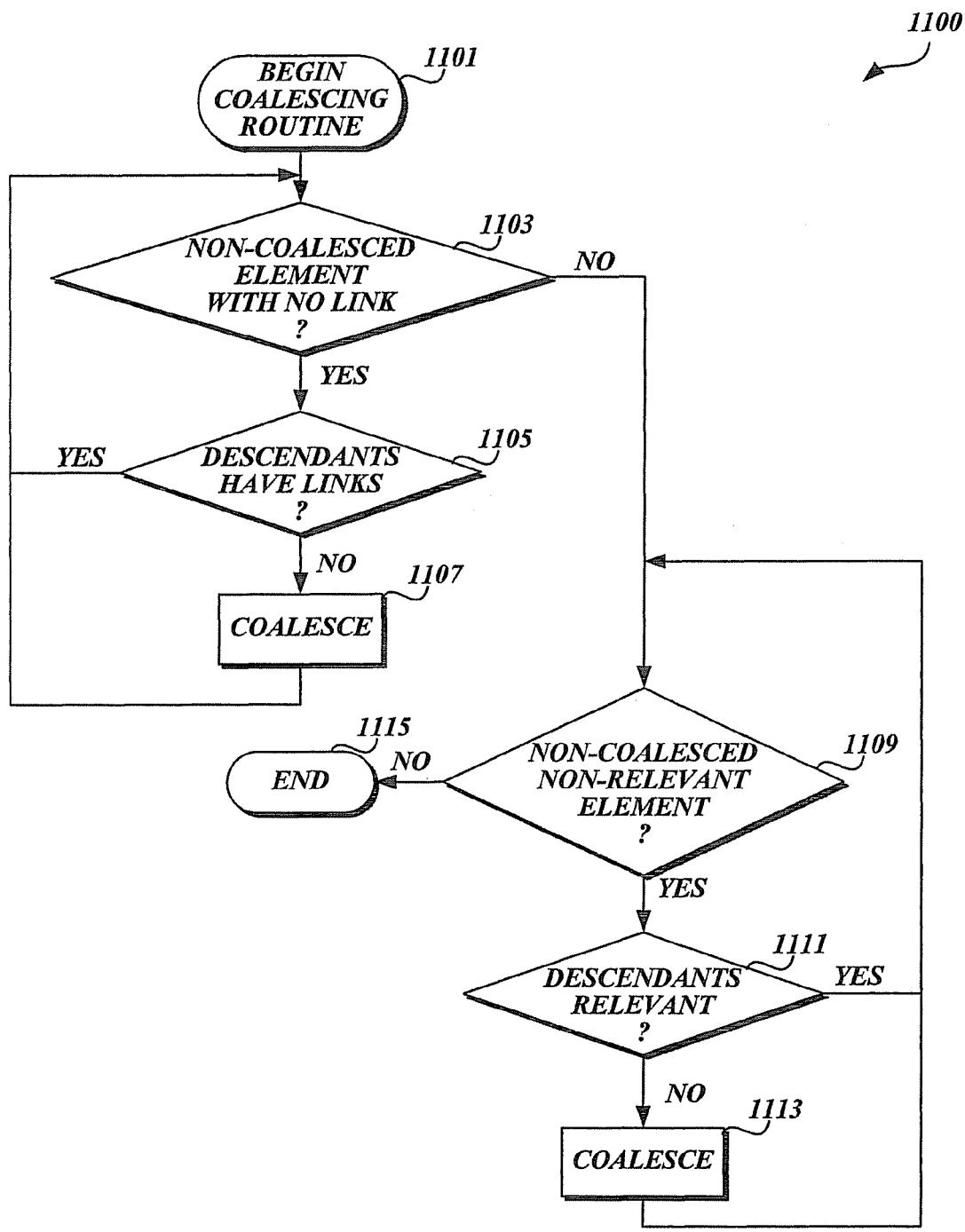
FIG. 11 is a block diagram of a coalescing routine for coalescing the graphical representation of non-linked or non-relevant elements of a schema, in accordance with an embodiment of the present invention.

FIG. 11 is a block diagram of a coalescing routine for coalescing non-linked or non-relevant elements of a schema, in accordance with an embodiment of the present invention. As will be appreciated by one of skill in the relevant art, the use of coalescing, as described herein, may be utilized to enhance any type of tree view representation of objects and is not limited to the tree view representation of a schema.

The coalescing routine 1100 may be performed on both the source schema and the destination schema. The coalescing routine 1100 begins at block 1101 and at decision block 1103 it is determined whether there is a non-coalesced element in a schema that has no link. If it is determined at decision block 1103 that there is a non-coalesced element that has no link, at decision block 1105 each of the descendents of that element are evaluated to determine if any of those descendents have links. If it is determined at decision block 1105 that none of the descendents of the element identified at decision block 1103 have links, at block 1107 the element identified at decision block 1103 and all of its descendents are coalesced, and represented collectively. In an embodiment of the present invention, a graphical icon, such as a down arrow, is displayed in the graphical interface as an identification of the coalesced elements.

Once elements have been coalesced at block 1107, or if it is determined at decision block 1105 that one of the descendents of the element identified at decision block 1103 have links, the coalescing routine 1100 returns to decision block 1103 and it is again determined if there are any additional non-coalesced elements with no links. The process of blocks 1103, 1105, and 1107 continue until all elements with no links have been processed and coalesced accordingly.

If it is determined at decision block 1103 that there are no remaining non-coalesced elements without links, at decision block 1109 it is determined whether there are any non-coalesced non-relevant elements. As discussed above, a non-relevant element is any element that is not part of the path of a selected object. If it is determined at decision block 1109 that there is a non-coalesced non-relevant element, at decision block 1111, it is determined whether any descendents of the element identified at decision block 1109 are relevant. If it is determined at decision block 1111 that the descendents are also not relevant, at block 1113, the element identified at decision block 1109 and its descendents are coalesced.

Once the elements have been coalesced at block 1113, or if it is determined at decision block 1111 that one or more of the descendents of the element identified in decision block 1109 are relevant to the selected object, the coalescing routine 1100 returns to decision block 1109 and the process continues. If it is determined at decision block 1109 that there are no remaining non-coalesced non-relevant elements, at block 1115 the coalescing routine 1100 completes.

In an alternate embodiment of the present invention, coalescing routine 1100 may determine after each sequence of coalescing elements whether all elements relevant to the selected object are viewable from within the display. If it is determined that all relevant elements are viewable from within the display, the routine may complete instead of continuing to coalesce all non-linked and/or non-relevant elements. In yet another embodiment, the coalescing routine 1100 may perform the coalescing of non-coalesced elements with no links, as accomplished by blocks 1103-1107 and upon completion of that portion of the routine 1100, determine if all elements relevant to the selected object are viewable from within the display before determining whether to continue coalescing any non-relevant elements that have not been coalesced, as accomplished by blocks 1109-1113.

Figure 12:
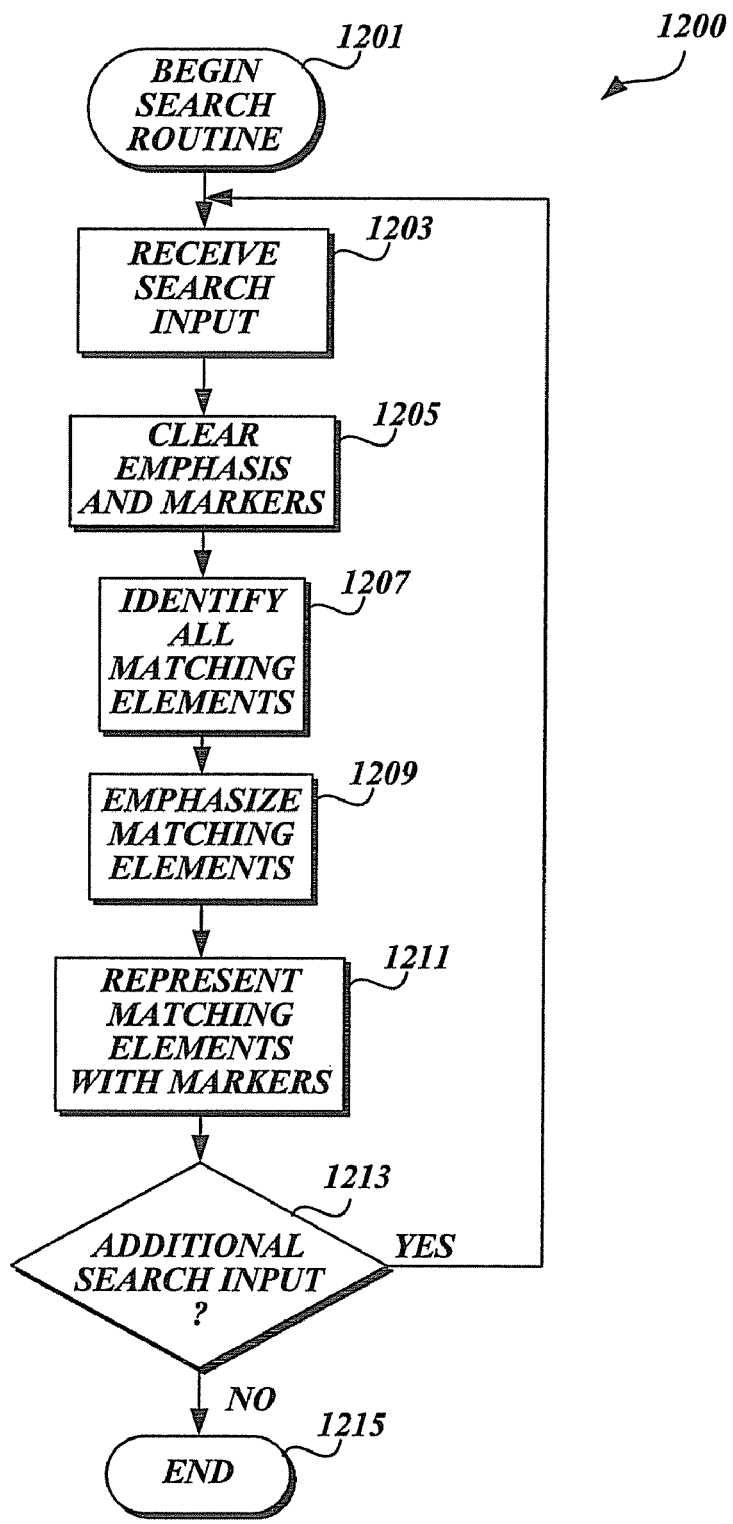
FIG. 12 is a block diagram of a search routine 1200 for searching for elements of a schema, in accordance with an embodiment of the present invention.

FIG. 12 is a block diagram of a search routine 1200 for searching for elements of a schema, in accordance with an embodiment of the present invention. As will be appreciated by one of skill in the relevant art, the use of searching, as described herein, may be utilized to enhance any type of representation of objects and is not limited to the tree view representation of a schema. The search routine 1200 begins at block 1201 and at block 1203 a search input is received. In an embodiment of the present invention, a search input may be a single character of a search term or an entire search term. Once a search input is received at block 1203, at block 1205, if there are any objects that are emphasized, the emphasis on those objects is removed. Additionally, any markers representing emphasized elements, are also cleared. At block 1207, all elements matching the search input are identified and at block 1209, those matching elements are emphasized. For example, returning to FIG. 8, if a user was performing a search for all elements containing "SSN," as illustrated by search block 805, as soon as the user typed the first character "S" all elements in the destination schema 807 that began with the letter "S" would be emphasized.

In addition to emphasizing matching elements, e.g., by highlighting those elements or placing blocks around those elements, etc., at block 1211, all matching elements are identified with markers. Identifying matching elements with markers, for example in the scroll bar 815 (FIG. 8), allows the user to determine the number and location of elements matching the current state of the search being performed. At decision block 1213, a determination is made as to whether there is additional search input, such as another character in the search term. If it is determined at decision block 1213 that there are additional inputs, the search routine 1200 returns to block 1203 and the process continues. However, if it is determined at decision block 1213 that there are no additional search input terms, at block 1215 the routine completes.

While embodiments of the invention have been illustrated and described, it will be appreciated that various changes can be made therein without departing from the spirit and scope of the invention.

The embodiments of the invention in which an exclusive property or privilege is claimed are defined as follows:

1. A method of simplifying a tree-view display of a mapping between a first schema and a second schema, comprising:
    receiving, at a program on a computing device, a selection of a particular object that graphically represents a schema element that is in the first schema of the tree-view display;
    evaluating, via a program on a computing device, a plurality of objects graphically representing schema elements in a mapping between the first schema and the second schema to identify a non-coalesced object;
    determining, via the program on the computing device, whether the non-coalesced object is linked to any objects of the first schema or the second schema;
    when the non-coalesced object is not linked to any objects of the first schema or the second schema, modifying the tree-view display via the computing device by automatically coalescing the non-coalesced object and one or more descendent objects of the non-coalesced object into coalesced objects that are hidden from a viewable area of the tree-view display, the coalescing rearranges the tree-view display so that the particular object that is selected is automatically moved from an initial position in the tree-view display to a centrally located position in the tree-view display; and
    displaying a pop up presentation of the non-coalesced object and the one or more descendent objects when a pointer is positioned over a graphical icon that identifies a location of the coalesced objects in the tree-view display.

2. A method of simplifying a tree-view display of a mapping between a first schema and a second schema, comprising:
    receiving a selection of a first object via a user interface of a computing device, wherein the first object is a graphical representation of a schema element of a mapping of two schemas;
    identifying, via a program on the computing device, a plurality of non-relevant objects that are not related to the first object by identifying a path leading into the first object that includes at least one link and at least one object;
    identifying, via the program on the computing device, a second object that is non-coalesced from the plurality of non-relevant objects that are not related to the first object, the second object having one or more descendent objects that are non-relevant and not related to the first object;
    generating a modified tree-view display without user input by using the program on the computing device to automatically coalesce the second object and the one or more descendent objects of the second object into coalesced objects that are hidden from the modified tree-view display; and
    displaying a pop up presentation of the second object and the one or more descendent objects when a pointer is positioned over a graphical icon that identifies a location of the coalesced objects in the tree-view display.

3. The method of claim 2, wherein the second object is not linked to the first object.

4. The method of claim 2, wherein the path identified leading into the first object further includes at least one functoid.

5. A computer-readable medium storing a computer executable program that, when executed, perform acts comprising:
    receiving a selection of a first object via a user interface of a computing device, wherein the first object is a graphical representation of a schema element used in mapping two schemas;
    identifying a plurality of objects relevant to the first object;
    determining that at least one object of the plurality of objects that are relevant to the first object is positioned outside of a display;
    identifying a second object that is non-relevant to the first object and non-coalesced as positioned within the display, the second object having one or more descendent objects positioned within the display that are non-relevant to the first object;
    automatically coalescing the second object with the one or more descendent objects into coalesced objects that are hidden from view such that the at least one object is moved from outside of the display to inside the display;
    bending a graphical link representation between the first object and a functionoid object to curve around an additional functionoid object that is horizontally aligned with the first object and the functionoid object, each functionoid object representing a corresponding functionoid that relates the schema element to an additional schema element used in mapping the two schemas;

identifying a third object that is non-relevant to the first object and non-coalesced as positioned within the display; and displaying a pop up presentation of the second object and the one or more descendent objects when a pointer is positioned over a graphical icon that identifies a location of the coalesced objects in the display.

6. The computer-readable medium of claim 5, wherein the computer executable program, when executed, is to further perform an act of unhiding the second object and the one or more descendent objects when the graphical icon is selected.

7. The computer-readable medium of claim 5, wherein identifying a plurality of objects includes identifying a path leading into the first object, wherein the path includes at least one link and one or more related objects.

8. A computer-readable medium storing a computer executable program that, when executed, perform acts comprising:

identifying a plurality of relevant objects in a tree-view structure of a mapping between a plurality of schemas, wherein at least one of the plurality of relevant objects is a first schema element and at least one of the plurality of the relevant objects is a second schema element;

identifying a non-linked non-relevant element in the first schema that includes a non-linked descendent element;

coalescing the non-linked non-relevant element and the non-linked descendent element into coalesced elements that are hidden from a viewable area of a display that shows the tree-view structure;

replacing the coalesced elements with a graphical representation on the viewable area of the display, the graphical representation being a part of the tree-view structure;

receiving a search query for an object representing an schema element in the tree-view display of the mapping between the plurality of schemas; and positioning a marker that is aligned with the graphical representation of the coalesced elements in a scrolling control portion of the display in response to determining that the coalesced elements include the scheme element represented by the object of the search query;

unhiding the non-linked non-relevant element and the non-linked descendent element when a graphical icon is selected;

identifying a non-relevant non-coalesced element in the first schema;

determining if a particular descendent element of the non-relevant non-coalesced element is relevant; and in response to determining that the particular descendent element of the non-relevant non-coalesced element is not relevant, coalescing the non-relevant non-coalesced element and the particular descendent element of the non-relevant non-coalesced element as an additional graphical representation.

9. The computer-readable medium of claim 8, wherein the coalescing includes determining if the descendent element of the non-linked non-relevant element is relevant and if it is determined that the descendent of the non-linked non-relevant element is not relevant, coalescing the non-linked non-relevant element and the descendent element of the non-linked non-relevant element.

10. The method of claim 8, wherein the graphical representation is selectable.

* * * * *